(12) United States Patent
Hassenpflug

(10) Patent No.: US 8,253,739 B2
(45) Date of Patent: Aug. 28, 2012

(54) METHOD FOR INTERPOLATING AN INTERMEDIATE POLYGON P FROM TWO POLYGONS P1 AND P2

(75) Inventor: Peter Hassenpflug, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1123 days.

(21) Appl. No.: 12/078,704

(22) Filed: Apr. 3, 2008

(65) Prior Publication Data

US 2009/0251465 A1   Oct. 8, 2009

(51) Int. Cl.
G06T 15/10       (2011.01)
(52) U.S. Cl. .................................... 345/427; 345/646
(58) Field of Classification Search .................. 345/427, 345/646
See application file for complete search history.

(56) References Cited

OTHER PUBLICATIONS

Burnett et al. "A deformable-model approach to semi-automatic segmentation of CT images demonstrated by application to the spinal canal", American Association of Physicists in Medicine, Feb. 2004, pp. 254-255.*
G.M. Treece et al., "Surface interpolation from sparse cross-sections using region correspondence", Cambridge University Engineering Department, Mar. 1999.
G. Barequet et al., "Contour interpolation by straight skeletons," Graphical Models, (vol. 66, No. 4, pp. 245-260, Jul. 2004).
D.H. Chen et al., "Boundary Based Parametric Polygon Morphing," Institute of electronics, Information, and Communication Engineers, vol. E84-D, No. 4, Apr. 2001.
H. Alt and M. Godau, "Computing the Fêrechet distance between two polygonal curves," International Journal of Computational Geometry and Applications, vol. 5, pp. 75-91,1995.
G. Barequet, M. T. Goodrich, A. Levi-Steiner and D. Steiner, "Contour interpolation by straight skeletons," Graphical Models, vol. 66, No. 4, pp. 245-260, Jul. 2004.
S. Bespamyatnikh, "An optimal morphing between polylines," International Journal of Computational Geometry and Applications, vol. 12, No. 3, pp. 217-228, 2002.
D. H. Chen and Y. N. Sun, "Boundary-based parametric polygon morphing," IEICE Transactions on Information and Systems, vol. E84-D, No. 4, pp. 511-520, 2001.
D. Cohen-Or, D. Levin and A. Solomovici, "Contour blending using warp-guided distance field interpolation," ACM Visualization '96, pp. 165-72,481, 1996.
C. A. Davatzikos, J. L. Prince and R. N. Bryan, "Image registration based on boundary mapping," IEEE Transactions on Medical Imaging, vol. 15, No. 1, pp. 112-115, Feb. 1996.
A. Efrat, L. J. Guibas, S. Har-Peled, J. S. B. Mitchell and T. M. Murali, "New similarity measures between polylines with applications to morphing and polygon sweeping," Discrete and Computational Geometry, vol. 28, No. 4, pp. 535-569,2002.
C. Gotsman and V. Surazhsky, "Guaranteed intersection-free polygon morphing," Computers and Graphics, vol. 25, No. 1, pp. 67-75, Feb. W01, 2001.
L. Guibas, 1. Hershberger and S. Suri, "Morphing simple polygons," Discrete and Computational Geometry, vol. 24, No. 1, pp. 1-34,2000.

(Continued)

Primary Examiner — Maurice L McDowell, Jr.
(74) Attorney, Agent, or Firm — Harness, Dickey & Pierce, P.L.C.

(57) ABSTRACT

A method for interpolating an intermediate polygon P from two polygons P1 and P2. The method includes, in at least one embodiment, defining a similarity measure based on a geometrical reference object, the geometrical reference object being associated with the two polygons P1 and P2; and based on the similarity measure, determining an initial pair of corresponding points. Based on this initial pair of corresponding points, in at least one embodiment of the method, a sequence of pairs of corresponding points is determined from which sequence the intermediate polygon is interpolated.

12 Claims, 5 Drawing Sheets

OTHER PUBLICATIONS

H. Gupta and R. Wenger, "Constructing piecewise linear homeomorphisms of simple polygons," Journal of Algorithms, vol. 22, pp. 142157, 1997.

G. T. Herman, J. Zheng and C. A. Bucholtz, "Shape-based interpolation," IEEE Computer Graphics and Applications, vol. 12, No. 3, pp. 6979, May 1992.

M. Mortara and M. Spagnuolo, "Similarity measures for blending polygonal shapes," Computers and Graphics, vol. 25, No. 1, pp. 13-27, Feb. 2001.

S. P. Raya and 1. K. Udupa, "Shape-based interpolation of multidimensional objects," IEEE Transactions on Medical imaging, vol. 9, No. I, pp. 32-42, Mar. 1990.

T. W. Sederberg, P. Gao, G. Wang and H. Mu, "2D shape blending: an intrinsic solution to the vertex path problem," In: Computer Graphics (Proc. of SIGGRAPH'93), vol. 27, pp. 15-18, 1993.

T. W. Sederberg and E. Greenwood, "A physically based approach to 2D shape blending," In: Computer Graphics (Proc. of SIGGRAPH'92), vol. 26, No. 2, pp. 25-34, 1992.

M. Shapira and A. Rappoport, "Shape blending using the star-skeleton representation," IEEE Computer Graphics and Applications, vol. 15, No. 2, pp. 44-50, Mar. 1995.

T. Surazhsky, V. Surazhsky, G. Barequet and A. Tal, "Shape blending. Blending polygonal shapes with different topologies," Computers and Graphics, vol. 25, pp. 29-39, 2001.

L. L. Bajaj, E. J. Coyle and K. N. Lin, "Arbitrary topology shape reconstruction from planar cross sections," Graphical Models and Image Processing, vol. 58, No. 6, pp. 524-543, 1996.

D. J. Burr, "Elastic matching ofline drawings," IEEE Transactions on Pattern Analysis and Machine Intelligence, vol. 3, No. 6, pp. 708-713, Nov. 1981.

G. Barequet and M. Sharir, "Piecewise-linear interpolation between polygonal slices," Computer Vision and Image Understanding, vol. 63, pp. 251-272, 1996.

G. Barequet, D. Shapiro and A. Tal, "Multi-level sensitive reconstruction of polyhedral surfaces from parallel slices," The Visual Computer, vol. 16, pp. 116-133, 2000.

S. Batnitzky, H. I. Price, P. N. Cook, L. T. Cook, and S. J. Dwyer III, "Three-dimensional computerreconstruction from surface contours for head CT examinations," Journal of Computer Assisted Tomography, vol. 5, pp. 60-67, 1981.

J. D. Boissonnat, "Shape reconstruction from planar cross-sections," Computer Vision, Graphics, and Image Processing., vol. 44, No. I, pp. 1-29, 1988.

I. Braude, J. Marker, K. Museth, J. Nissanov and D. Breen, "Contour-based surface reconstruction using MPU implicit models," Graphical Models, vol. 69, No. 2, pp. 139-157, Mar. 2007.

S. Y. Chen, W. C. Lin, C. C. Liang and C. T. Chen, "Improvement on dynamic elastic interpolation technique for reconstructing 3-D objects from serial cross sections," IEEE Transactions on Medical Imaging, vol. 9, No. I, pp. 71-83, Mar. 1990.

A. B. Ekoule, F. C. Peyrin and C. L. Odet, "A triangulation algorithm from arbitrary shaped multiple planar contours," ACM Transactions on Graphics, vol. 10, No. 2, pp. 182-199, Apr. 1991.

H. Fuchs, Z. M. Kedern and S. P. Uselton, "Optimal surface reconstruction from planar contours," Communications of the ACM, vol. 20, No. 10, Nov. 1977.

K. Fujimura, "Shape reconstruction from contours using isotopic deformation," Graphical Models and Image Processing, vol. 61, No. 3, pp. 127-147,1999.

G. Gong and B. Parvin, "An algebraic solution to surface recovery from cross-sectional contours," Graphical Models and Image Processing, vol. 61, No. 4, pp. 222-243, 1999.

M. Jones and M. Chen, "A new approach to the construction of surfaces from contour data," Computer Graphics Forum, vol. 13, No. 3, pp. 75-84, 1994.

E. Keppel, "Approximating complex surfaces by triangulation of contour line," IBM Journal of Research and Development, vol. 19, No. I, pp. 2-11, Jan. 1975.

R. Klein, A. Schilling and W. Strasser, "Reconstruction and simplification of surfaces from contours," Graphical Models, vol. 62, No. 6, pp. 429-443, 2000.

W. C. Lin, S. Y. Chen, "A new surface interpolation technique for reconstructing 3D objects from serial cross-sections," Computer Vision, Graphics, and Image Processing., vol. 48, No. I, pp. 124-143, Oct. 1989.

D. Meyers and S. Skinner, "Surfaces from Contours," ACM Transactions on Graphics, vol. 11, No. 3, pp. 228-258, Jul. 1992.

M. Moshfeghi, "Elastic matching of multimodality medical images," CVGIP: Graphical Models and Image Processing, vol. 53, pp. 271-282, May 1991.

J. M. Oliva, M. Perrin and S. Coquillart, "3D reconstruction of complex polyhedral shapes from contours using a simplified generalized Voronoi diagram," Computer Graphics Forum, vol. 15, No. 3, pp. C-397-C-408, 1996.

G. M. Treece, R. W. Prager, A. H. Gee and L. Berman, "Surface interpolation from sparse cross sections using region correspondence," IEEE Transactions on Medical Imaging, vol. 19, No. 11, pp. 1106-1114, Nov. 2000.

M.J. Zyda, A.. R. Jones and P. G. Hogan, "Surface construction from planar contours," Computers and Graphics, vol. 11, pp. 393-408, 1987.

\* cited by examiner

METHOD FOR INTERPOLATING AN INTERMEDIATE POLYGON P FROM TWO POLYGONS P1 AND P2

FIELD

At least one embodiment of the present invention generally relates to the field of medical image processing and in particular generally relates to the area of segmentation of volumetric image data sets.

BACKGROUND

Medical facilities have come to rely more and more on computerized systems for the purposes of diagnosis and therapy.

Many medical imaging processes are based on high quality volumetric image data acquired by computer-controlled high performance modalities such as computer tomographs (CT), positron emission tomographs (PET) and magnetic resonance (MR) scanners. In general, three-dimensional (3D) volumetric image data are processed by modern volume rendering processors to obtain two-dimensional (2D) cross-sectional views, called slices, which are then visually examined by the radiologist for the purposes of diagnosis or therapy. The slices allow the radiologist to examine a condition of a patient as they show a cross-sectional representation of an organ of interest, for example the liver or the kidneys of a patient, afflicted for example by a tumor. The information in the slices relevant for diagnosis or therapy, that is information related to the organ of interest, is referred to as regions of interest.

The regions of interest are defined by coordinates of pixels in the slice or a number of parallel, spatially adjacent slices of a volumetric image data set. The regions of interest must first be extracted by a procedure known as segmentation before they can be made accessible to a post-processing computer system for the purposes of diagnosis, therapy or follow-up. The segmentation of the slices allows the radiologist to obtain a coordinate-wise definition of the regions of interest and to feed this information for example into a control unit of a linear accelerator for the purposes of radiotherapy. The linear accelerator can then be controlled such as to direct a beam to a specific organ of the patient as defined by the regions of interest, for example a cancerous liver.

Currently, the segmentation of the regions of interest is performed manually or semi-automatically by the radiologist. The radiologist uses for example a mouse or other pointer tools to outline the regions within the slices by contours. The coordinates within the slices marked by the contours are then translated into polygons by mathematical or CAD software systems and fed into dedicated segmentation supporting software systems.

There are known in the state of the prior art a number of such segmentation supporting software systems, for example "Live Wire", "Live Lane" or "Interactive Active Contours". The volumetric image data captured by the high performance medical modalities are capable of acquiring the slices in smaller than 0.5 mm intervals across an axis of the patient. This results in the organ of interest to be represented by the regions of interest being distributed across many hundreds of adjacent slices. Marking the regions of interest within each one of those slices is therefore not feasible. The segmentation supporting software system assists the radiologist in this tedious and time consuming but all the more important task of segmentation of regions of interest by using a number of different interpolation algorithms.

These algorithms interpolate from an ideally small number of polygons representing the contours of the regions of interest in those slices actually marked by the radiologist to obtain intermediate polygons and ultimately contours for the regions of interest within the slices not marked by the radiologist.

The polygon interpolation algorithms also known as "contour morphing", "two-dimensional shape blending", or "boundary mapping", take as input two adjacent polygons from which the intermediate polygon is interpolated.

The polygon interpolation algorithms normally comprise a step of calculating pairs of corresponding points from among the points of the two polygons.

Each point in the pair of corresponding points is from different ones of the two polygons. The pairs of corresponding points are then used for the actual interpolation of the points of the intermediate polygon, each pair yielding an point of the intermediate polygon.

Furthermore, the interpolation algorithms are based on a similarity measure used as normally restricting or constraining the step of determining the pairs of corresponding points. However, interpolation algorithms used in current segmentation supporting software systems are suffering from a number of shortcomings.

The segmentation supporting software systems relying for example on the boundary based parametric polygon morphing algorithm by D. H. Chen and Y. N. Sun (IEICE Transactions and Information Systems, Vol. E84-D, No. 4, pp. 511-520, 2001) necessitate a high degree of interactivity as they require the radiologist to prescribe corresponding points manually between the polygons. Although this system somewhat cuts down the time for performing the segmentation in that the radiologist is no longer needed to perform the segmentations on all of the slices, it still remains a time consuming task due to the semi-automatic character of this algorithm.

Furthermore, the method by Chen & Sun requires the slices from which the two polygons have been derived to be parallel. The applicability of this algorithm for clinical purposes is therefore restricted.

Other polygon algorithms lead to prohibitively long computation times, thus rendering corresponding segmentation supporting software systems unsuitable for the fast-paced clinical environment.

Those polygon interpolation algorithms scale quadratically or even cubically with a number of sampling points on the two polygons used for the interpolation. The reason for those time complexities is manifold. For example, some of the polygon interpolation algorithms require a comparison of each point of one of the polygons with each of the points of the other polygon. Examples of algorithms having higher complexity are provided by algorithm basing the step of determining corresponding points on the rasterization of areas enclosed by each of the two polygons, see for example G. M. Treece et al., "Surface interpolation from sparse cross sections using region correspondence," IEEE Transactions on Medical Imaging (Vol. 19, No. 11, pp 1106-1114, November 2000) or first deriving a skeleton of the polygonal shape, see for example G. Barequet et al., "Contour interpolation by straight skeletons," Graphical Models (Vol. 66, No. 4, pp 245-260, July 2004). Other examples are the polygon interpolation algorithm according to A. Efrat et al. that uses a similarity measure based on "geodesic width" or "linkwidth" which ultimately results in the algorithm to scale quadratically with the number of sample points.

As segmentation lies at the heart of many important diagnostic and therapeutic processes there is a need for fast and efficient polygon interpolation algorithms. There is also a need for a polygon interpolation algorithm that is fully automatic and only requires a minimal degree of user interaction.

There is a further need for a polygon interpolation algorithm that can dispense with the requirement of polygons being derived from parallel slices.

There is furthermore a need in the art for a polygon interpolation algorithm that scales less than quadratically with the number of sampling points.

SUMMARY

At least one embodiment of the invention addresses at least one of the needs in the art of medical image processing in providing a system and a method for polygon interpolation suitable for automatic segmentation of regions of interest within slices, in at least one embodiment the method being based on an easy to implement and computationally efficient similarity measure for calculating the pairs of corresponding points.

The solution according to at least one embodiment of the invention allows reconstruction of three-dimensional structures such as organs of interest as represented in medical volumetric data sets on the basis of intermediate polygons interpolated from pairs of polygons $P_1$ and $P_2$, the polygons $P_1$ and $P_2$ outlining cross-sectional structures, that is regions of interests, of the organ of interest to be reconstructed.

Accordingly, it is an object of at least one embodiment of the present invention to provide a method for interpolating at least one intermediate polygon $P_i$ from two adjacent polygons $P_1$ and $P_2$ the method comprising:
defining a similarity measure based on a geometrical reference object; the geometrical reference object is associated with the two polygons $P_1$ and $P_2$;
based on the similarity measure, determining an initial pair of corresponding points;
iteratively generating from the initial pair of corresponding points a sequence of pairs of corresponding points; any pair in the sequence of the corresponding points is related only to the immediate predecessor pair of corresponding points in the sequence wherein this relation is established by way of the geometrical reference object;
interpolating points of the intermediate polygon either from the initial pair of corresponding points or from one pair of corresponding points from the generated sequence of pairs of corresponding points.

The term "polygon" refers to a two-dimensional figure defined by a set of vertices and connecting edges. However, the term is meant also to include higher dimensional "polygons" such as 3-dimensional polyhedrons defined by boundary surfaces. The polygons outline regions of interest within medical image data such as slices derived from volumetric data acquired from tomographic imaging modalities. The polygons may also refer to figures used in key frames interpolated for the purposes of generating animated cartoons.

By the term "similarity measure" is meant a function or a procedure suitable to ascertain a similarity of the two polygons with respect to their shape.

According to one aspect of at least one embodiment of the present invention, the "geometric reference object" is taken to be a circle circumscribing both of the polygons $P_1$ and $P_2$. However, other geometrical figures are also within the scope of the invention such as an ellipse or an ellipsoid if the polygons are higher dimensional. In particular, according to one aspect of at least one embodiment of the present invention, the geometrical reference object is in a plane parallel to planes of the two polygons $P_1$ and $P_2$.

The term "pair of corresponding points" refers to a pair of points where one point is taken from polygon $P_1$ and the other point is taken from the polygon $P_2$.

By linearly generating, is meant a procedure where each pair of corresponding points in the sequence is derivable from its immediate predecessor pair of corresponding points in the sequence, starting out with the initial pair of corresponding points. This allows keeping the computation time from scaling quadratically, as there is no mutual comparison involved of each of the points from one of the polygons $P_1$ or $P_2$ with each of the points from the other polygon.

The interpolation is based on the pairs of corresponding points in as much as each point of the intermediate polygon is derived from exactly one pair of corresponding points from the sequence of pairs of corresponding points. The interpolation method according to at least one embodiment of the invention is fully automatic as the iterative generation procedure for the pairs of corresponding points does not require user-interaction.

According to an alternative aspect of at least one embodiment of the invention, the user can still require reinterpolation of a selected number of intermediate polygons in case some the selected intermediate polygons are incompatible with medical knowledge.

According to one aspect of at least one embodiment of the present invention the definition of the similarity measure comprises:
acquiring distance profiles D1 and D2 for $P_1$ and $P_2$ respectively; the distance profiles D1 and D2 measure a deviation of the shapes of the polygons $P_1$ and $P_2$, respectively, from the shape of the geometrical reference object;
re-sampling the distance for the measures D1 and D2 at common sampling points;
storing independently each of the re-sampled distance profiles D1 and D2 as search data structures;
comparing the stored distance profile measures D1 and D2 to obtain the similarity measure.

According to one aspect of at least one embodiment of the present invention the similarity measure includes two distance profiles D1 and D2. The distance profiles D1 and D2 are functions or procedures suitable to measure the difference of shape between polygon $P_1$ and the geometric reference object on the one hand and the polygon $P_2$ and the geometric reference object on the other hand. The shapes of the polygons $P_1$ and $P_2$ are compared by reference to the shape of the geometric reference object. Hence, the shapes of the polygons $P_1$ and $P_2$ are compared indirectly. This allows for a simple implementation of measuring similarity by the similarity measure if the geometric reference object has a simple shape, such as a circular shape.

The distance profiles D1 and D2 are re-sampled according to Shannon's sampling theorem such as not to loose information concerning the shapes of the polygons $P_1$ and $P_2$ as encoded therein and such that both re-sampled distance profiles D1 and D2 comprise an equal number of sample points. This allows storing of the distance profiles D1 and D2 as search data structures for example as balanced binary search trees or other suitable search data structures.

The geometric reference object is represented in parameter form by a parameterizing parameter. By using the parameterizing parameter of the geometric reference object as a search key in the search data structure the iterative generation procedure for the pairs of corresponding points can be efficiently implemented such as to even further reduced computation time.

According to another aspect of at least one embodiment of the present invention the step of determining the initial pair of corresponding points includes minimizing the similarity measure over the geometric reference object by using the parameterizing parameter of the geometric reference object. In this way, the initial pair of corresponding points from the associated polygons $P_1$ and $P_2$ are obtained.

The method according to at least one embodiment of the present invention for interpolating the intermediate polygon therefore requires the solution of only one minimization problem. The argument of the minimum of the similarity measure over the geometric reference object is a specific value for the parameterizing parameter of the geometric reference object. The specific value of the parameterizing parameter is then used as a search key for a look-up within the search data structures representing the distance profiles D1 and D2. This look-up procedure yields the initial pair of corresponding points. The iterative generating procedure for the sequence of pairs of corresponding points requires iterative look-ups to obtain the sequence of pairs of corresponding points one by one. A mutual comparison of points of the two polygons is not necessary, neither is there required a solution of any further minimization problem. This allows keeping the computation time from scaling quadratically.

A further objective of at least one embodiment of at least one embodiment of the present invention is to provide a method for measuring a similarity of two polygons $P_1$ and $P_2$ based on the above similarity measure. According to one aspect of at least one embodiment of the present invention this method for measuring the similarity of the two polygons $P_1$ and $P_2$ is used for the purposes of shape morphing. A method for measuring the similarity is used to assess as "goodness" of fit of an intermediate polygon with respect to the two polygons $P_1$ and $P_2$. The intermediate polygon is though to be one of a number of polygons in the series of polygons involved in a process of morphing one of the two polygons $P_1$ and $P_2$ into the other polygon $P_2$ and $P_1$ respectively. The method can be usefully employed in the field of computer graphics, key frame animation, or shape extrusion in the field of 3D-modeling of three-dimensional objects.

According to yet another aspect of at least one embodiment of the present invention, there is provided a computer program being loadable in a memory of a computer, wherein the computer program is adapted to carry out the steps of the methods as mentioned above.

Another aspect of at least one embodiment of the present invention provides a system suitable for automatically segmenting volume data slices as acquired by medical imaging modalities. The slices are thought to include marked slices, having marked contours, marking regions of interest within the marked slices and blank slices having no marked contours. The system includes the following components:

an interpolation unit suitable to implement the above method of interpolating an intermediate polygon such as to obtain interpolated marked contours in the blank slices from the marked contours in the marked slices;
a super-position unit suitable for superposing the marked contours and the interpolated marked contours such as to obtain a representation of the regions of interest, the representations are 3D-reconstructions of an organ of interest defined by the regions of interest within the slices.

DETAILED DESCRIPTION OF EMBODIMENTS OF THE INVENTION

Figure 1:
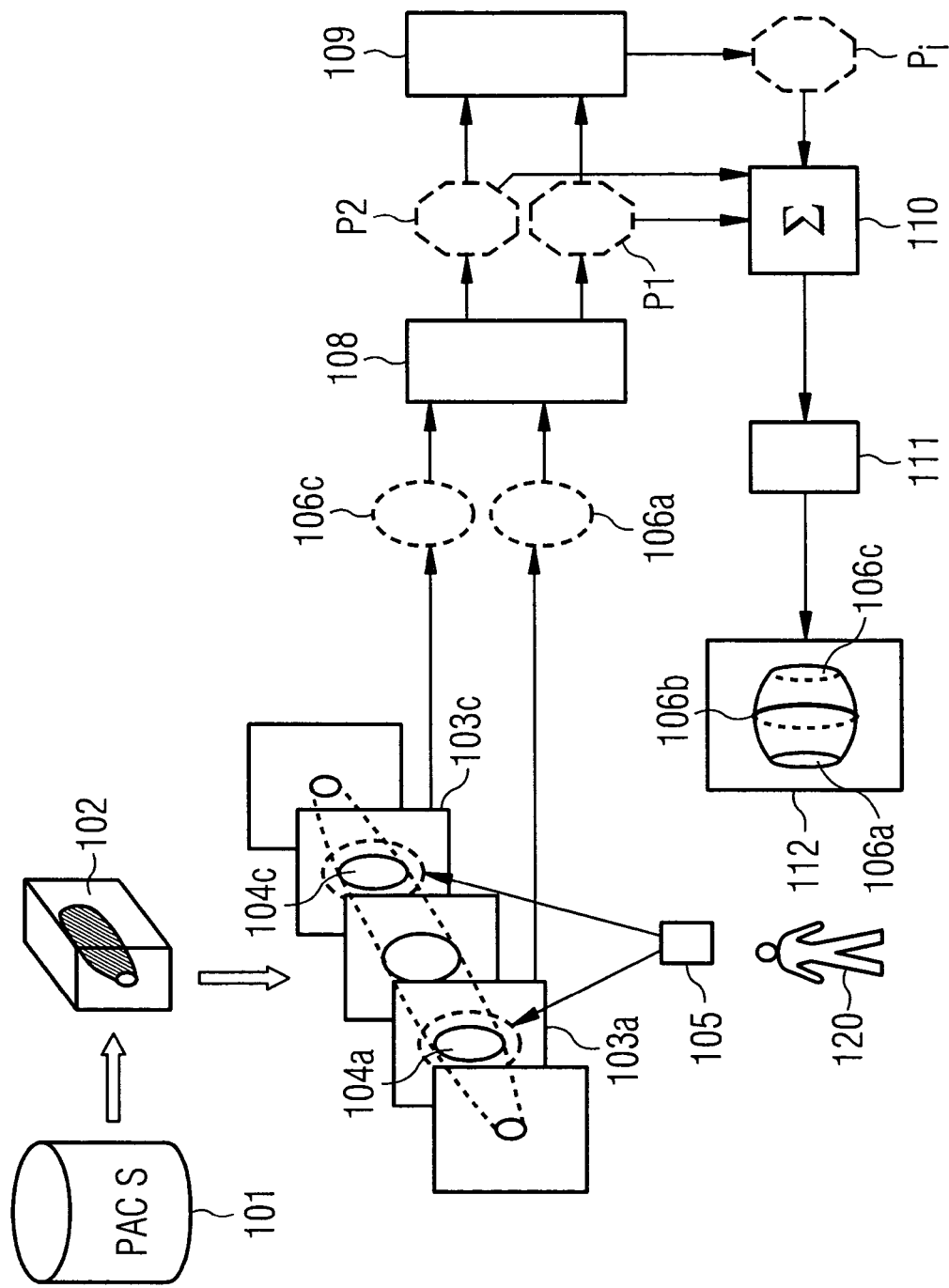
FIG. 1 is a schematic drawing of the automated segmentation system.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Embodiments of a method for interpolating at least one intermediate polygon are described hereinafter. In the following description, meaning of specific details is given to provide a thorough understanding of embodiments of the invention. One skilled in the relevant art will recognize, however, that the invention can be practiced without one or more of the specific details, or with other methods, modules, entities etc. In other instances, well-known structures, computer related functions or operations are not shown or described in detail, as they will be understood by those skilled in the art.

Further, the method is described with respect to slices from medical volumetric image data. However, it is apparent that also other categories or another kind of data, for example like graphical data in animation, might also be applied and processed, respectively.

Reference throughout this specification to "one/an aspect" means that a particular feature, structure or characteristic described in connection with the embodiment is included in at least one embodiment of the present invention. Thus, the appearances of the phrases "according to one aspect" or the like in various places throughout this specification are not necessarily all referring to the same embodiment. Furthermore, the particular features, structures or characteristics may be combined in any suitable manner in one or more embodiments.

Referring now to FIG. 1 there is illustrated an example embodiment of the system according to the present invention for automatically segmenting slices 103a and 103c with respect to regions of interest 104a, 104c within the slices 103a and 103c, respectively.

The slices 103a and 103c are derived from a volumetric data block 102 obtained from a picture archive communication system 101 (PACS). The volumetric data cube 102 has been acquired from a patient by means of a tomographic image modality for example a computer tomography (CT) or a positron emission tomograph (PET), or other such imaging modality. The slices 103a and 103c are provided as medical image files in the well-known DICOM (Digital Imaging and Communications in Medicine) format.

A radiologist 120 examines the slices 103a and 103c with regions of interest 104a and 104c represented as cross-sectional views of an organ of interest. The radiologist 120 uses a marker tool 105 to outline the regions of interest 104a, 104c by contours 106a, 106c. The marker tool 105—for example a mouse or an electronic stylus—is suitable to capture sets of coordinate information of the pixels making up the contours 106a and 106c.

According to one aspect of at least one embodiment of the present invention, the radiologist 120 is replaced by an automatic marking device not shown), being in communication with a medical expert system and a pattern recognition unit. According to this aspect, the user enters into the marking device a descriptor of the organ of interest. The descriptor is then communicated to the medical expert system. Responsive thereto, the medical expert system passes structural information describing geometrical features and approximate locations of the organ of interest. Using these files, the pattern recognition unit then scans the slices 103a and 103b and controls the automatic marking device to automatically generate the sets of coordinate information of the contours 106a and 106c.

Those sets of coordinate information of the contours 106a and 106c are then passed to an approximation unit 108 in which the contours 106a and 106c are converted into polygons $P_1$ and $P_2$, respectively. The polygons $P_1$ and $P_2$ are represented as ordered sets of vertices and connecting edges between those vertices. The polygons $P_1$ and $P_2$ are then fed into the interpolation unit 109 according to the invention. The interpolation unit 109 that produces as an output an intermediate polygon $P_i$. The intermediate polygon $P_i$ is then superposed by the super position unit 110 with the polygons $P_1$ and $P_2$ to obtain a reconstructed 3D data set 112 of the organ of interest after a 3D graphical unit 111 has converted the polygons $P_1$, $P_i$ and $P_2$ back or into contours 106a, 106b and 106c, respectively. The reconstructed 3D data set 112 can then be used by the radiologist 120 for more detailed diagnostic purposes of the organ of interest represented by the 3D-data set or to control a linear accelerator for the purposes of radiotherapy of the patient.

The operation of the interpolation unit 109 will now be explained in more detail. First there are provided some technical notes.

A polygon P is considered to be represented as an ordered sequence of n vertices $v_i$, i=0, . . . , n−1, n>2, connected by straight line segments forming a closed polyline.

A polygon is planar if all its vertices are located on a common Euclidean plane Π.

A polygon is simple if it does not intersect itself.

In the parameter form $\vec{v}(t)$, the points of a polygon are a geometric object regarded as being produced by a mapping of a free real parameter variable t∈I=[0,1]⊂ $\Re$ into the real Euclidean plane $\Re^2$(onto the points of the polygon $(x_t, y_t)$ in Cartesian coordinates):

$$\vec{v}: I=[0,1] \to \Re^2$$

$$t \mapsto \vec{v}(t)=(x_t, y_t)$$

Remark: The two parameters t=0 and t=1 both refer to the point given by the first vertex $v_0 = \vec{v}(0) = \vec{v}(1)$ of polygon P. The parameter form defines sample points on the polygon $\vec{v}(t)$ for each parameter t. For simplicity of notation, a sample point at t will also be referred to by $\vec{v}(t)$.

All rectangular regions that are denoted with R in the procedure below are considered to be of equal size having the same orientation, that is, they have their axes aligned.

Prerequisites of and assumptions made by the method according to one aspect to at least one embodiment of the present invention:

The method assumes that the two polygons $P_1$ and $P_2$ are not rotated with respect to each other and there has not been a significant dilation or compression of an underlying three-dimensional geometry of the volumetric data set, i.e., the "anatomy" of the patient. More particularly, deformations of the underlying three- or higher dimensional geometry being captured by $P_1$ and $P_2$ are assumed to modify corresponding points only homeomorphically with respect to the parameter form of the two polygons $P_1$ and $P_2$. The deformation is assumed to preserve a continuous, injective—"one-to-one"—relationship between corresponding parameter values of the two polygons and thus may be regarded as a conformal mapping. Note that the prerequisites and assumptions made by the method according to at least one embodiment of the present invention are met by most three-dimensional medical image data as they are acquired for example by the medical imaging modalities CT, PET, or MR scanners, and the patient is normally required not to move whilst the tree-dimensional medical image data is being acquired. The prerequisites and assumptions are also fulfilled for most of the anatomy captured in the three-dimensional medical image data acquired by these modalities, in particular by all solid organs like bones, kidneys, livers and solid tissues like lesions.

The interpolation of the intermediate polygon $P_i$ according to the invention from sparsely-spaced contours outlined by the radiologist is provided on the basis of the slices $R_1$ and $R_2$, the slices defining parallel image planes through the three- or higher-dimensional medical image data set is an efficient means to reduce the time and workload for the clinician to segment and measure extended three-dimensional objects like lesions.

A similarity measure D according to at least one embodiment of the present invention is specifically tailored to this task. It can be computed efficiently and enables an easy implementation of the method, the steps of which are outlined below.

It is to be understood, that the steps are to be applied repeatedly to further pairs of two polygons derived from further slices or from intermediate polygons already interpolated until a sufficient number of further intermediate polygons have been interpolated such that the organ of interest can be reconstructed to a level of detail as required.

The two simple planar polygons $P_1$ and $P_2$ are each located within its own frame of reference, $P_1$ in $R_1$ and $P_2$ in $R_2$, each constituting a fixed-sized rectangular region for the polygons. In particular, $R_1$ and $R_2$ can correspond to the slices 103a, 103c. Each one of the frame of reference $R_1$ and $R_2$ is located in its own three- or higher-dimensional Euclidean plane. More particularly, $R_1$ is located on $\Pi_1$ and $R_2$ is located on $\Pi_2$, given the constraints that $\Pi_1$ and $\Pi_2$ are parallel to each other, in symbols $\Pi_1 \| \Pi_2$, and are not identical, in symbols, $\Pi_1 \neq \Pi_2$ and that the orthographic projection of $R_1$ onto $\Pi_2$ yields $R_2$ and, vice versa, that the orthographic projection of $R_2$ onto $\Pi_1$ yields $R_1$. Those geometrical relationships are shown in FIG. 2.

Furthermore, an intermediate three-dimensional Euclidean plane $\Pi_i$ specifies where the intermediate planar polygon $P_i$ shall be interpolated from the surrounding parallel planar polygons $P_1$ and $P_2$. According to one aspect of an embodiment of the present invention, $\Pi_i$ may be taken to be parallel to $\Pi_1$ and $\Pi_2$, i.e., $\Pi_1 \| \Pi_i \| \Pi_2$, as shown in FIG. 1. According to another aspect of the present invention, the intermediate plane $\Pi_i$ may be taken to be non-parallel as long as the enclosed angle between the normal vectors $\vec{n}_1$ of $\Pi_1$ and $\vec{n}_i$ of $\Pi_i$ is less than or equal to 45 degrees ($\angle(\vec{n}_1, \vec{n}_i) > 45°$) such that an intermediate frame of reference $R_i$ of $P_i$ is given by projecting $R_1$ or $R_2$ onto $\Pi_i$ and $R_i$ is completely enclosed by $\Pi_1$ and $\Pi_2$.

The spatial domain polygon interpolation method according to an embodiment of the invention requires as input, along with the two polygons $P_1$ and $P_2$ a specification of the planes $\Pi_1, \Pi_2$ and $\Pi_i$. The planes $\Pi_1, \Pi_2$ and $\Pi_i$ are specified by their normals and their mutual distances $d_{1,2}$, $d_{1,i}$ and $d_{2,i}$ as shown in FIG. 2.

Figure 2:
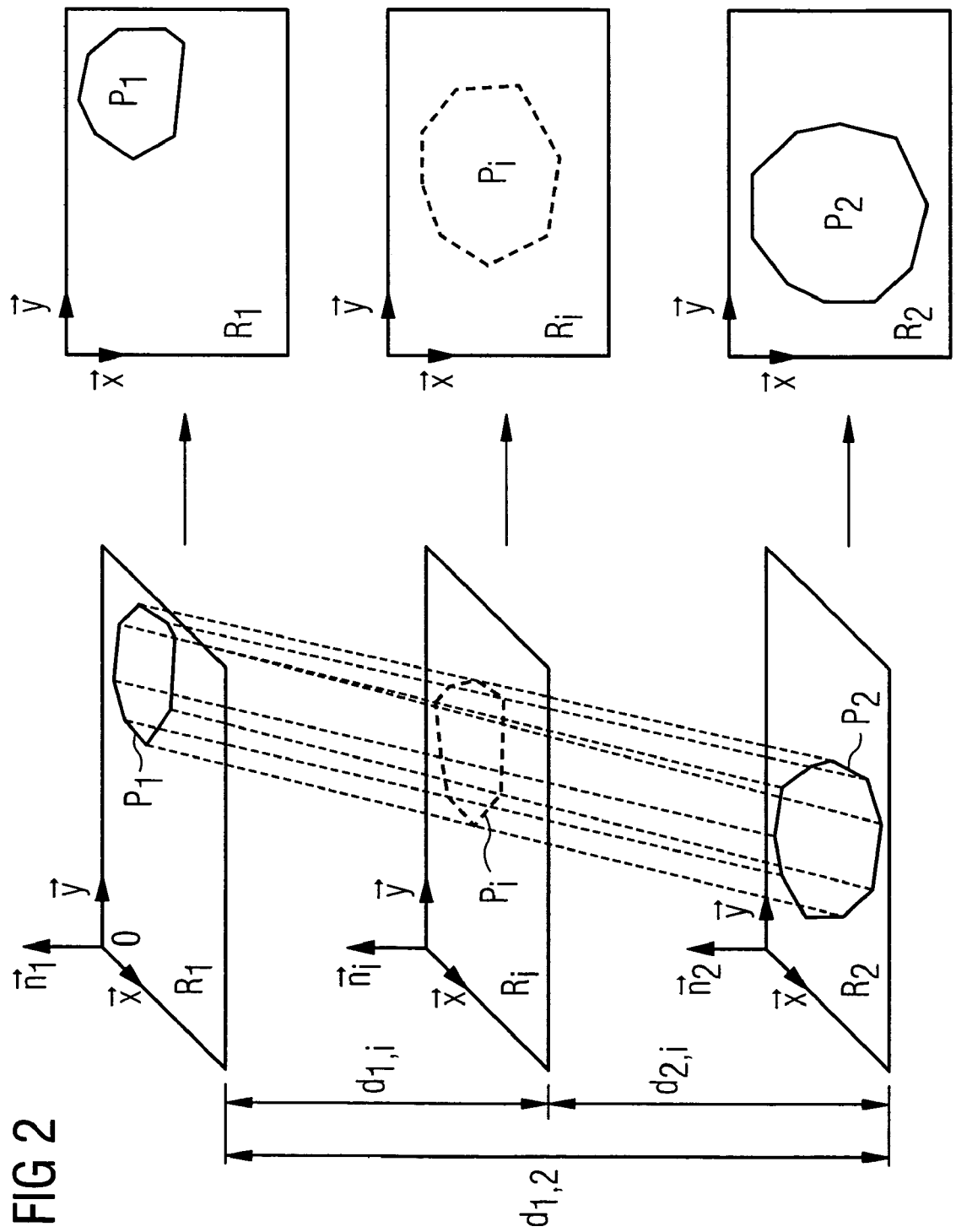
FIG. 2 is a schematic drawing of the spatial relationships between two polygons $P_1$ and $P_2$ and the intermediate polygon $P_i$.

The output produced by the method according to an embodiment of the invention is a planar polygon $P_i$ located within the intermediate frame of reference $R_i$ on $\Pi_i$ interpolated from the two given adjacent polygons $P_1$ and $P_2$ as shown in FIG. 2.

The method according to an embodiment of the present invention comprises the following general steps:

Iteratively generating pairs of corresponding points between the two polygons $P_1$ and $P_2$, the iteration being based on an initial pair of corresponding points.

Defining and employing a distance-based similarity measure according to the present invention. The similarity measure is defined on a bounding circle $B_C$ of two centered polygons $P_1'$ and $P_2'$. The two centered polygons are derived from the two polygons $P_1$ and $P_2$. The bounding circle circumscribes both of the two centered polygons $P_1'$ and $P_2'$.

Another step generates pairs of corresponding points between $P_1$ and $P_2$ to interpolate the intermediate polygon $P_i$ on the intermediate plane $\Pi_i$.

The method is straightforward to implement and can be computed efficiently in $O(N \log N)$ time.

The step of defining the similarity measure includes the following steps for obtaining a pair of initial corresponding parameter values $(\hat{t}_1, \hat{t}_2)$ specifying the initial pair of corresponding points of $P_1$ and $P_2$ in less than $O(n^3)$ time. In the following, for each of the steps, the order of time complexity is specified.

The steps below allow implementation by standard CAD or mathematical hard- or software modules, such as MATLAB®, Mathematica® or dedicated functions or methods available in C, C++ or JAVA function or method libraries.

1. Linear time: Parameterize both, $P_1$ and $P_2$ to obtain a parameter form for each one of the two polygons $P_1$ and $P_2$. As the roles of the two parameter forms are entirely symmetric, they will be referred to collectively as $\vec{v}(t)$. The parameter form defines sample points on each of the polygons. Ensure that both $P_1$ and $P_2$ have equal orientation, for example clockwise.

2. Linear time: Work out the centroids $C(P_1)$ and $C(P_2)$ of the two polygons $P_1$ and $P_2$, respectively.

Figure 3:
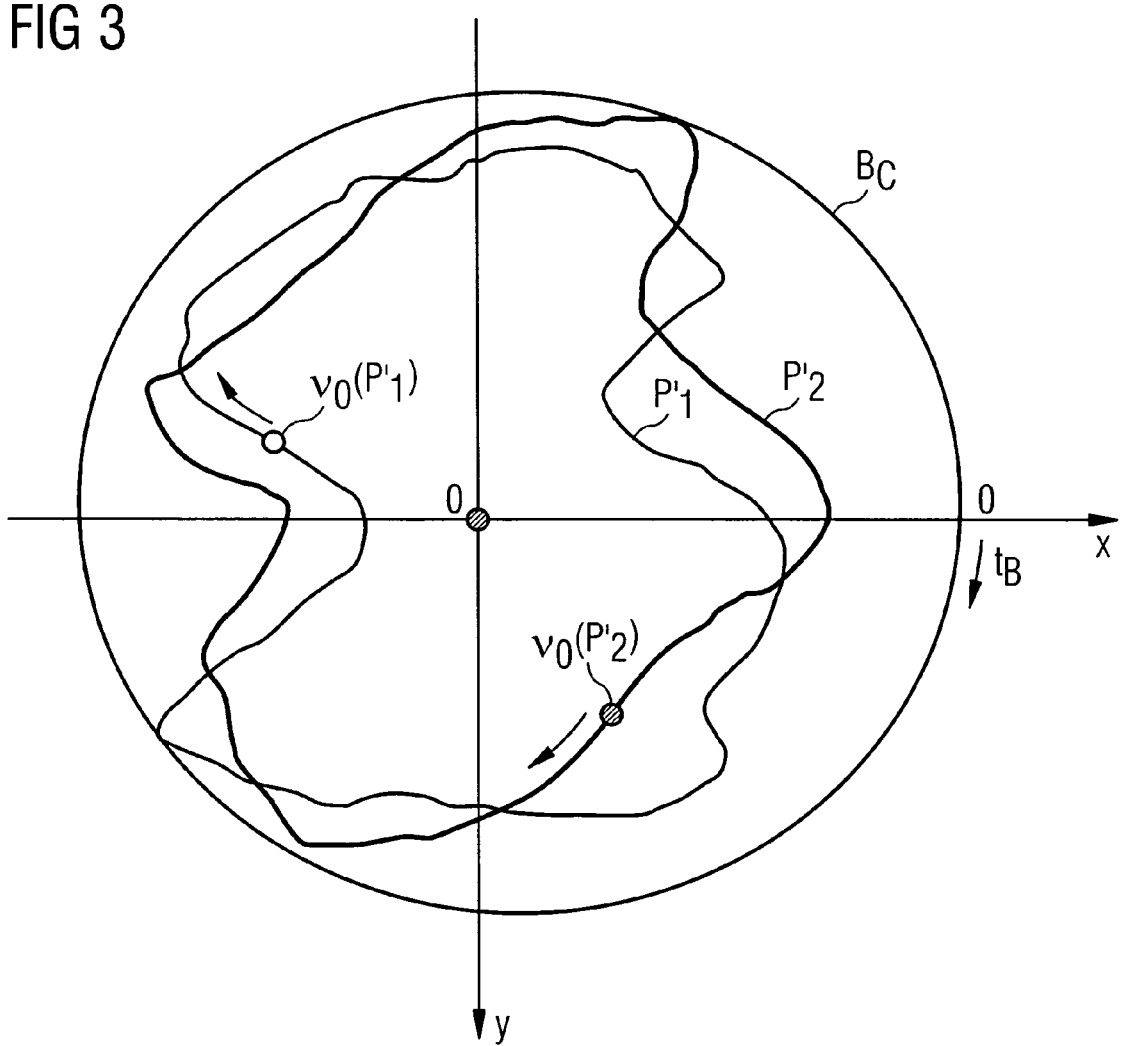
FIG. 3 is a schematic drawing showing the relationship between the circumscribed circle as a geometrical reference object and two polygons $P_1$ and $P_2$.

3. Linear time: Center the two polygons $P_1$ and $P_2$ about their in-plane origin $O=(0,0)$ by translating all vertices of $P_1$ by the direction vector $\vec{u}_1 = -C(P_1)$ and the vertices of $P_2$ by the direction vector $\vec{u}_2 = -C(P_2)$ yielding the two translated polygons $P_1'$ and $P_2'$ as shown in FIG. 3.

4. O(N log N) time: Work out the bounding circle $B_C$ circumscribing all vertices of both $P_1'$ and $P_2'$. $B_C$ is specified via its centroid $C(B_C)$ and radius $r_B$ as indicated in FIG. 3.

5. Linear time: According to one aspect of an embodiment of the present invention the method involves a step of calculating the perimeters of the two polygons, denoted $L_1 = L(P_1)$ and $L_2 = L(P_2)$, respectively, and the circumference of the bounding circle, denoted by $L_B = L(B_C)$. This is to increase efficiency of implementation as it allows memory allocation during sampling and re-sampling procedures described below. Alternatively the step of calculating the perimeters and/or the circumference can be skipped or calculated "on the fly".

Figure 4:
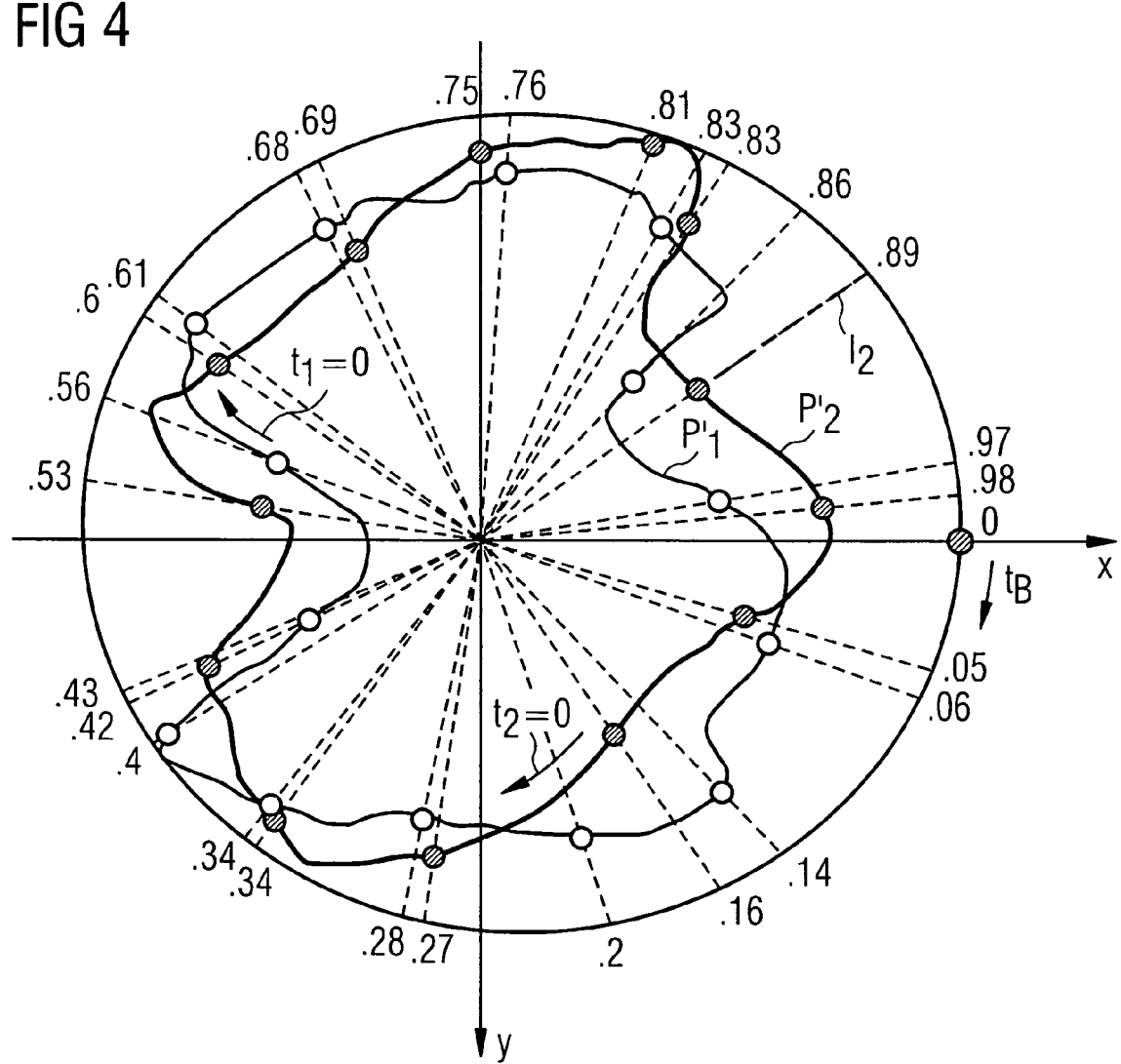
FIG. 4 is a schematic drawing showing how the distance profiles are acquired with reference to the geometrical reference object.

5. For both polygons $P_1'$ and $P_2'$ do the following:

Linear time: as shown in FIG. 4, for each sample point $\vec{v}(t)$ of $P_1'$ and $P_2'$ employ some equidistantly spaced discretization of the parameterized parameter t work out a distance of the current sample point $\vec{v}(t)$ to the bounding circle $B_C$ as follows:

Calculate the two points of intersection of the line that runs through the centroid $C(B_C)$ of the bounding circle $B_C$ and the sample point $\vec{v}(t)$. This line is divided into two line segments between its two points of intersection with the bounding circle and $\vec{v}(t)$. In order to unambiguously single out a distance-defining line segment among the two line segments, the length of which will be taken to be the distance of the sample point $\vec{v}(t)$ to the bounding circle $B_C$, determine the polygon's current normal vector $\vec{n}_P(t)$ at the position of the current point $\vec{v}(t)$. The normal vector of the line $\vec{n}_1$ applied at the current polygonal point $\vec{v}(t)$ divides the Euclidean plane into two half-planes each containing exactly one of the two line segments worked out above. Choose among the two line segments the line segment whose half-plane contains $\vec{n}_P(t)$.

This line segment is the distance-defining line segment. The point of intersection of the distance-defining line segment with $B_C$ corresponds to a parameterizing parameter of $B_C$ having a certain parameter value $t_B$ with $t_B = 0$ defining the point of intersection of the bounding circle with the positive x axis. The length of the distance-defining line segment l is the distance of the current polygonal point $\vec{v}(t)$ to the bounding circle $B_C$ at parameter $t_B$. The length of the distance-defining line segment is shown by example in FIG. 4 for $t_B = 0.89$.

Logarithmic time: For each vertex $\vec{v}(t)$ of $P_1'$ store the resulting pairs $(t_B, (t_1, l_1))$, that is the parameter value $t_B$ associated with the respective length of the distances-defining line segment $l_1$ and $t_1$ being the parameter for the respective sampling point on $P_1'$, in an ordered search data structure BBT1. According to one aspect of an embodiment of the present invention, BBT1 is a balanced binary search tree. The structure of BBT1 allows to linearly iterate over the stored $t_B$ values, which values serve as "search keys" in increasing order. Therewith, the search of an existing pair $(t_B, (t_1, l_1))$, which is nearest to some given $t_B$ value, is bounded by maximal $\log_2 N_1$ comparisons with $N_1$ representing the number of stored key-value pairs in BBT1.

Furthermore, BBT1 allows for the definition of two constant-time operations $LN(t_B)$ and $RN(t_B)$ for returning the left and right neighbor of $t_B$ or an indication that no such neighbor exists. The invertibility $\{t_1\} \to \{t_B\}$ is ensured by inserting $(t_B, (t_1, l_1))$ into BBT1 only if $LN(t_B)$ does not exist or $RN(t_B)$ does not exist or $LN(t_B).t_1 < t_1 < RN(t_B).t_1$. Similarly, build up a corresponding search data structure BBT2 for the ordered pairs $(t_B, (t_2, l_2))$ obtained for the vertices of $P_2'$.

Figure 5:
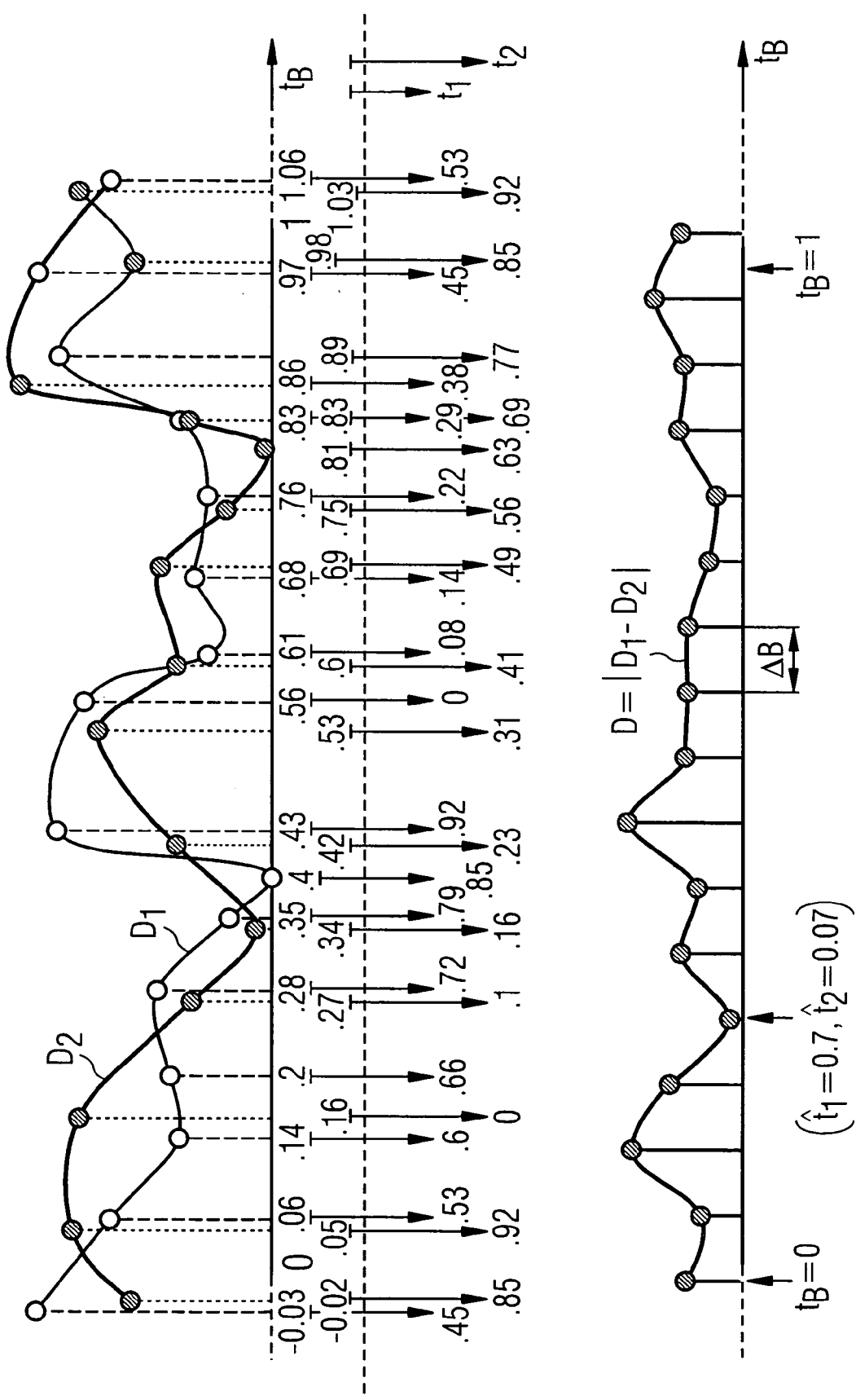
FIG. 5 shows an example of the two distance profiles D1 and D2 and the similarity measure D.

Linear time: According to one aspect of an embodiment of the present invention a distance profile $D_1$ maps the irregularly sampled parameter positions $\{t_B\}$ to the length of the distance-defining line segments $\{l_1\}$. Work out a corresponding curve to acquire a distance profile $D_2$ accordingly as shown in FIG. 5. As can be seen in FIG. 5, the distance profiles $D_1$ and $D_2$ provide a measure for a deviation of the shape of the two polygons $P_1$ and $P_2$ from the circular shape of the bounding circle $B_C$. For example, the closer $D_2$ resembles a horizontal line, the lesser the deviation of the shape of $P_2$ from the circular shape of the bounding circle $B_C$.

According to another aspect of an embodiment of the present invention, the distance profiles $D_1$ and $D_2$ are taken to be the stored pairs $(t_B, (t_1, l_1))$ and $(t_B, (t_2, l_2))$ in BBT1 and BBT2 interpreted as discrete mappings $\{t_B\} \to \{(t_1, l_1)\}$ und $\{t_B\} \to \{(t_2, l_2)\}$ restricted to the second coordinate, that is to the lengths of the distance-defining line segments $l_1$ and $l_2$, respectively.

Equidistantly re-sampling the similarity mappings $D_1$ and $D_2$ on the basis of BBT1 and BBT2 at parameter positions $\tilde{t}_B$ according to one aspect of an embodiment of the present invention comprises the further steps of employing some use case specific re-sampling interval $\Delta B$ such that Shannon's sampling theorem is fulfilled. For simplicity, the re-sampled distance profiles are also denoted by $D_1$ and $D_2$.

Linear time: Compare the distance profiles $D_1$ and $D_2$ to obtain the similarity measure D, in a general form, as $$(P_1, P_2) \mapsto D(D_1, D_2) = \left( \int_0^1 |D_1 - D_2|^2 dt \right)^{\frac{1}{2}},$$

wherein the integration is along the parameter $t_B$ over the bounding circle $B_C$. For the purposes of implementing the method for interpolation according to an embodiment of the present invention the similarity measure D is discretized and the integration becomes a summation over discrete values of $t_B$.

According to an embodiment of the present invention, the similarity measure D is subjected to discrete numerical minimization as explained below. It is therefore permissible for the sake of numerical efficiency to skip the square root and squaring of the summands in the formula above for the similarity measure D and to rather consider the unsigned difference between the distance profiles $D_1$ and $D_2$:

$$D = |D_1 - D_2|.$$

According to the prerequisites and assumptions above, the deformations of the underlying three-dimensional geometry are homeomorphic. This allows, working out $\tilde{t}_1$ and $\tilde{t}_2$ by linearly approximating from the left and right neighbors, $LN(\tilde{t}_B)$ and $RN(\tilde{t}_B)$, respectively, according to the formula $$\tilde{t}_1 = \frac{(\tilde{t}_B - LN(\tilde{t}_B))(BBT1 \cdot RN(\tilde{t}_B) \cdot t_1 - BBT1 \cdot LN(\tilde{t}_B) \cdot t_1)}{RN(\tilde{t}_B) - LN(\tilde{t}_B)} + BBT1 \cdot LN(\tilde{t}_B) \cdot t_1$$

and similarly for $\tilde{t}_2$, yielding the two pairs $(\tilde{t}_B, (\tilde{t}_1, \tilde{l}_1))$ and $(\tilde{t}_B, (\tilde{t}_2, \tilde{l}_2))$, respectively, at corresponding, equally-spaced parameter values $\tilde{t}_B$, as shown in FIG. 5. The two pairs $(\tilde{t}_B, (\tilde{t}_1, \tilde{l}_1))$ and $(\tilde{t}_B, (\tilde{t}_2, \tilde{l}_2))$ allow an efficient representation of the distance profiles $D_1$ and $D_2$ by storing the value pair $(\tilde{t}_1, \tilde{l}_1)$ associated with $\tilde{t}_B$ in an indexed vector $V_1$, and similarly for $(\tilde{t}_2, \tilde{l}_2)$, in an indexed vector $V_2$.

The number of elements in each vector is given by $$K = \text{size}(V_1) = \text{size}(V_2) = \left\lfloor \frac{L_B}{\Delta B} \right\rfloor, L_B = L(B_C)$$

denoting the circumference of the bounding circle.

The discretized similarity measure D is then accordingly represented as a difference vector:

$$V = |V_1 - V_2|.$$

Linear time: Determining the initial pair of corresponding points by minimizing the discretized similarity measure $$D = |D_1 - D_2|.$$

See lower part of FIG. 5 for a schematic representation of the minimization of D.

The minimization of D is done by searching for the minimal difference with respect to the lengths of the distance-defining line segments $l_1$ and $l_2$ in the difference vector $V = |V_1 - V_2|$ over all $k=0, \ldots, K-1$ indices and returning the initial pair of corresponding polygon parameters $(\hat{t}_1, \hat{t}_2)$ associated by way of the parameter form $\vec{v}(t)$ with the initial pair of corresponding points, i.e., determine $$(\hat{t}_1, \hat{t}_2) = \left(V_1[\hat{k}] \cdot \tilde{t}_1, V_2[\hat{k}] \cdot \tilde{t}_2\right)$$

with $$\hat{k} = \underset{k=0,\ldots,K-1}{\text{argmin}} \left|V_1[k] \cdot \tilde{l}_1 - V_2[k] \cdot \tilde{l}_2\right|.$$

According to another aspect of an embodiment of the present invention, the above linear-time, local procedure for determining the initial pair of corresponding parameters between $P_1$ and $P_2$ can be replaced with the following more robust global procedure at the cost of O(N log N) computation time:

Work out $\hat{k}$ by locating the maximum of the cyclic cross-correlation function $\rho_{V_1 V_2}[k]$ for $V_1[k]\tilde{l}_1$ and $V_2[k]\tilde{l}_2$ interpreted as discrete time series, which can be computed efficiently via the inverse fast Fourier transform of the cross-power spectrum $S_{V_1 V_2}[q]$ of the two series $$S_{V_1 V_2}[q] = \frac{1}{2K} \overline{\left|FFT\{V_1[k]\tilde{l}_1\}[q]\right|} FFT\{V_2[k] \cdot \tilde{l}_2\}[q] \Rightarrow \rho_{V_1 V_2}[k]$$
$$= IFFT\{S_{V_1 V_2}[q]\}$$

See for example E. O. Brigham, "The Fast Fourier Transform and Applications," Englewood Cliffs, N.J.: Prentice Hall, 1988). Therewith, we work out the index of optimal correspondence, $$\hat{k} = \underset{k=0,\ldots,K-1}{\text{argmax}} \rho_{V_1 V_2}[k]$$

and select the initial pair of corresponding polygon parameters $(\hat{t}_1, \hat{t}_2) = (V_1[\hat{k}]\tilde{t}_1, V_2[\hat{k}]\tilde{t}_2)$ as above.

After having determined the initial pair of corresponding points, a sequence of pairs of corresponding points is iteratively generated, starting from the initial pair of corresponding polygon parameters $(\hat{t}_1, \hat{t}_2)$.

According to one aspect of an embodiment of the present invention, the polygon parameter $\hat{t}_1$ is incremented by a suitable off-set value $\Delta t$. Using the incremented polygon parameter $\hat{t}_1 + \Delta t$ for a reverse look up in BBT1 via $\{t_B\} \leftarrow \{(t_1, l_1)\}$ yields the "search key" $\tilde{t}_B$ and a second look-up in BBT2 via $\{t_B\} \rightarrow \{(t_2, l_2)\}$ using the search key $\tilde{t}_B$ yields a parameter corresponding to the parameter $\hat{t}_2 + \Delta t$. This parameter together with the parameter $\hat{t}_1 + \Delta t$ is the next pair of corresponding parameters defining the sequence. Application of the parameter form to the next pair of corresponding parameters results in the next pair of corresponding points after the initial pair of corresponding points. In this way, the sequence of corresponding parameters is iteratively generated by successively incrementing the parameter $\hat{t}_1 + \Delta t$ for the points on the Polygon $P_1$ to obtain corresponding points on the polygon $P_2$.

Minimizing $V = |V_1 - V_2|$ needs to be performed only once to obtain the initial pair of corresponding points the initial pair of corresponding polygon parameters $(\hat{t}_1, \hat{t}_2)$, whereas the next pairs of corresponding points in the sequence are obtained by the simple two-fold look-up procedure based on the search key $\tilde{t}_B$. There is no mutual comparison of the points from the two polygons involved in determining the pair of corresponding points according to an embodiment of the invention.

Finally, the interpolation step includes:

For each pair of the corresponding parameters the corresponding pair of points of $P_1$ and $P_2$ are obtained by the parameter form. The points in each of the resulting pairs of corresponding points are then connected by a three-dimensional straight line segment. The point of intersection of the resulting line segment with the plane $\Pi_i$ is then determined, thus yielding the points of the intermediate polygon $P_i$ by iterating over the sequence of pairs of corresponding points as shown in FIG. 2.

The above description of illustrated embodiments of the invention is not intended to be exhaustive or to limit the invention to precise forms disclosed. While specific embodiments of, and examples for, the invention are described herein for illustrative purposes various equivalent modifications are possible within the scope of the invention and can be made without a deviating from the spirit and scope of the invention.

For instance, the description is based on the DICOM format. Alternatively, another medical format might also be used for the method and system according to an embodiment of the invention.

Further, the method might be implemented in software, in coded form. Alternatively, it is possible to implement the method according to an embodiment of the invention in hardware or hardware modules. The hardware modules are then adapted to perform the functionality of the steps of the method. Furthermore, it is possible to have a combination of hardware and software modules.

These and other modifications can be made to the invention with regard of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for interpolating an intermediate polygon from two polygons, the method comprising:
    defining, by a processor, a similarity measure based on a geometrical reference object and distance profiles, the geometrical reference object being one of a circle, an ellipse and an ellipsoid circumscribing the two polygons and the distance profiles being stored as a balanced binary search tree;
    determining based on the similarity measure, an initial pair of corresponding points by minimizing the similarity measure over the geometrical reference object, to obtain the initial pair of corresponding points from the associated two polygons;
    iteratively generating, from the initial pair of corresponding points, a sequence of pairs of corresponding points, any pair of corresponding points being related to an immediate predecessor pair of corresponding points by way of the geometrical reference object; and
    interpolating the intermediate polygon either from the initial pair of corresponding points or from one pair of corresponding points from the generated sequence of pairs of corresponding points.

2. A method according to claim 1, wherein defining the similarity measure comprises:
    acquiring the respective distance profiles for each of the two polygons, wherein the respective distance profiles are each related to a deviation from the geometrical reference object of a respective one of the two polygons;
    re-sampling the distance profile measures at common sampling points;
    storing independently each of the re-sampled distance profiles as search data structures; and
    comparing the stored distance profiles to obtain the similarity measure.

3. A method according to claim 2, wherein the search data structure is associated with the balanced binary search tree.

4. System suitable for automatically segmenting volume data slices acquired by a medical modality, the slices including marked slices having marked contours marking regions of interest within the marked slices and blank slices having no marked contours, the system comprising:
    an interpolation unit, suitable to implement the method according to claim 1; and
    a superposition unit, suitable to superpose the marked contours and the interpolated marked contours.

5. The system of claim 4, wherein the interpolation unit is suitable to implement the method according to claim 1, to obtain interpolated marked contours in the blank slices from the marked contours in the marked slices.

6. The system of claim 4, wherein the superposition unit is suitable to superpose the marked contours and the interpolated marked contours to obtain a representation of the regions of interests, the representation having a higher dimension than the slices.

7. A non-transitory computer readable medium including program segments for, when executed on a computer device, causing the computer device to implement the method of claim 1.

8. A method for measuring a similarity of two polygons, the method comprising:
    associating, by a processor, a geometrical reference object with the two polygons, the geometrical reference object being a circle circumscribing the two polygons;
    acquiring respective distance profiles for each of the two polygons, wherein the respective distance profiles are each related to a deviation from the geometrical reference object of a respective one of the two polygons and the distance profiles being stored as a balanced binary search tree;
    measuring the similarity of the two polygons by comparing the distance profile, a degree of difference of the distance profiles being proportional to the similarity of the two polygons; and
    minimizing the similarity measure over the geometrical reference object, to obtain the initial pair of corresponding points from the associated two polygons.

9. A method for measuring the similarity of two polygons according to claim 8, the method being used for shape morphing, the intermediate polygon being one of a number of polygons in morphing one of the two polygons into the other of the two polygons.

10. A method for measuring the similarity of two polygons according to claim 9, the method being used for shape morphing to assess a goodness of fit of an intermediate polygon with respect to the two polygons, the intermediate polygon being one of a number of polygons in morphing one of the two polygons into the other of the two polygons.

11. A system for interpolating an intermediate polygon from two polygons, the system comprising:
    a processor to,
        define a similarity measure based on a geometrical reference object and distance profiles, the geometrical reference object being a circle circumscribing the two polygons and the distance profiles being stored as a balanced binary search tree, and determine, based on the similarity measure, an initial pair of corresponding points by minimizing the similarity measure over the geometrical reference object, to obtain the initial pair of corresponding points from the associated two polygons;

a generator to iteratively generate, from the initial pair of corresponding points, a sequence of pairs of corresponding points, any pair of corresponding points being related to an immediate predecessor pair of corresponding points by way of the geometrical reference object; and an interpolator to interpolate the intermediate polygon either from the initial pair of corresponding points or from one pair of corresponding points from the generated sequence of pairs of corresponding points.

12. A system according to claim 11, wherein defining the similarity measure includes acquiring the respective distance profiles for each of the two polygons, and the respective distance profiles are each related to a deviation from the geometrical reference object of a respective one the two polygons, and the system further comprises:

a re-sampler to re-sample the distance profile measures D1 and D2 at common sampling points;

a storage element to store independently each of the resampled distance profiles as search data structures associated with the balanced binary search tree; and a comparer to compare the stored distance profiles to obtain the similarity measure.

\* \* \* \* \*